(12) United States Patent
Kobayashi et al.

(10) Patent No.: US 9,632,496 B2
(45) Date of Patent: Apr. 25, 2017

(54) ENGINEERING APPARATUS WHICH ASSOCIATES PROGRAMMABLE LOGIC CONTROLLER DATA WITH HUMAN MACHINE INTERFACE DATA

(75) Inventors: Tsuyoshi Kobayashi, Chiyoda-ku (JP); Toshio Muranaka, Chiyoda-ku (JP); Satoshi Mii, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 666 days.

(21) Appl. No.: 13/984,982

(22) PCT Filed: Feb. 21, 2011

(86) PCT No.: PCT/JP2011/053735
§ 371 (c)(1),
(2), (4) Date: Aug. 12, 2013

(87) PCT Pub. No.: WO2012/114444
PCT Pub. Date: Aug. 30, 2012

(65) Prior Publication Data
US 2013/0325153 A1    Dec. 5, 2013

(51) Int. Cl.
G05B 19/05    (2006.01)

(52) U.S. Cl.
CPC ......... G05B 19/056 (2013.01); G05B 19/052 (2013.01); G05B 2219/13144 (2013.01)

(58) Field of Classification Search
CPC .... G05B 19/02; G05B 19/052; G05B 19/056; G05B 2219/13144
(Continued)

(56) References Cited

U.S. PATENT DOCUMENTS 5,432,932 A * 7/1995 Chen et al. ............... 718/103
5,483,468 A * 1/1996 Chen et al. ............... 702/186
(Continued)

FOREIGN PATENT DOCUMENTS

CN    101292204 A    10/2008
JP    2001-075790 A    3/2001
(Continued)

OTHER PUBLICATIONS

English translation (machine) of patent document WO 2010/103700, published Sep. 16, 2010.*
(Continued)

*Primary Examiner* — M. N. Von Buhr
(74) *Attorney, Agent, or Firm* — Sughrue Mion, PLLC; Richard C. Turner

(57) ABSTRACT

An engineering apparatus for designing an FA system includes: a system-configuration-data generating unit that generates system configuration data that expresses a display apparatus and a control apparatus of an FA system that is an engineering target and a topology thereof; a component storing unit that stores a control component, a screen component, and label information as a set by associating the control component, the screen component, and the label information with each other by using a label name; a component allocating unit that performs allocation of the control component to the control apparatus; a component reflecting unit that renders the control component a usable state for generating; an apparatus-connection-information generating unit that automatically generates apparatus connection information; a label-device-information editing unit that edits actual device information that corresponds to label information; and a component resolving unit that renders the apparatus connection information and the actual device information.

9 Claims, 7 Drawing Sheets

(58) Field of Classification Search
USPC .......................................................... 700/87
See application file for complete search history.

(56) References Cited

U.S. PATENT DOCUMENTS

| | | | | |
|---|---|---|---|---|
| 5,613,115 | A * | 3/1997 | Gihl | G05B 19/056 |
| | | | | 700/17 |
| 6,754,885 | B1 * | 6/2004 | Dardinski | G05B 15/02 |
| | | | | 717/113 |
| 7,089,530 | B1 * | 8/2006 | Dardinski | G05B 15/02 |
| | | | | 700/83 |
| 7,096,465 | B1 * | 8/2006 | Dardinski | G05B 19/0426 |
| | | | | 717/121 |
| 7,272,815 | B1 * | 9/2007 | Eldridge | G06F 8/71 |
| | | | | 707/999.009 |
| 7,275,236 | B1 * | 9/2007 | Kabe | G05B 19/056 |
| | | | | 717/106 |
| 8,499,277 | B2 | 7/2013 | Tone et al. | |
| 2005/0228517 | A1 * | 10/2005 | Tomita | G05B 19/0426 |
| | | | | 700/87 |
| 2006/0206866 | A1 * | 9/2006 | Eldrige | G05B 15/02 |
| | | | | 717/122 |
| 2007/0182740 | A1 * | 8/2007 | Konami et al. | 345/440 |
| 2009/0276059 | A1 * | 11/2009 | Tone et al. | 700/7 |
| 2013/0327822 | A1 * | 12/2013 | Keefe et al. | 235/375 |

FOREIGN PATENT DOCUMENTS

| | | |
|---|---|---|
| JP | 2003-044105 A | 2/2003 |
| JP | 2003-131709 A | 5/2003 |
| JP | 2005-259079 A | 9/2005 |
| JP | 2005-327263 A | 11/2005 |
| JP | 2007-265252 A | 10/2007 |
| JP | 2009-157534 A | 7/2009 |
| WO | 2007/110953 A1 | 10/2007 |
| WO | 2010/103700 A1 | 9/2010 |

OTHER PUBLICATIONS

Communication dated Feb. 3, 2015 from the State Intellectual Property Office of the People's Republic of China in counterpart application No. 201180068053.1.
(English Translation) Notice of Rejection, relating to JP 2011-541423 A, dated Jan. 10, 2012.
International Search Report for PCT/JP2011/053735, dated Jun. 7, 2011.

* cited by examiner

FIG.6

| HMI | TARGET PLC | RELAY NETWORK 1 | RELAY PLC 1 | RELAY NETWORK 2 | RELAY PLC 2 | RELAY NETWORK 3 |
|---|---|---|---|---|---|---|
| HMI_1 | PLC_3 | NETWORK X | PLC_1 | NETWORK Y | – | – |

FIG.7

| LABEL IDENTIFIER | DATA TYPE | DEVICE |
|---|---|---|
| COMPONENT A_1. CURRENT VALUE | WORD | D100 |
| COMPONENT A_1. TARGET VALUE | WORD | D101 |
| COMPONENT A_1. TARGET VALUE UP | BOOL | X0 |
| COMPONENT A_1. TARGET VALUE DOWN | BOOL | X1 |

ENGINEERING APPARATUS WHICH ASSOCIATES PROGRAMMABLE LOGIC CONTROLLER DATA WITH HUMAN MACHINE INTERFACE DATA

CROSS REFERENCE TO RELATED APPLICATIONS

This application is a National Stage of International Application No. PCT/JP2011/053735 filed Feb. 21, 2011, the contents of all of which are incorporated herein by reference in their entirety.

FIELD

The present invention relates to an engineering apparatus that designs a system composed of FA (Factory Automation) equipment, such as a programmable controller (PLC) and a display (HMI).

BACKGROUND

In recent years, systems composed of FA equipment have become complicated and large, and the amount of programs for the PLCs and motion controllers used in the systems has been increasing. As a method of reducing the man-hours in such cases, there is a technology in which specific processes are defined in advance as components such as function blocks such that they can be easily used.

Moreover, systems composed of FA equipment are provided with a man-machine interface in many cases and in most of these cases, an HMI is used. There is a technology in which specialized screens for specific processes are modularized in advance also for an HMI such that they can be easily used.

The systems are in many cases configured such that a PLC that functions as a control part and an HMI that functions as a man-machine interface for a control target are used as a set in FA equipment. In such systems, the development efficiently is improved by using the modularization technology described above.

Moreover, for example, Patent Literature 1 discloses a technology that improves the efficiency of generating a program and generating an HMI screen by associating a ladder program with an HMI screen by using variable names in advance. With the use of this technology, the ladder logic process and the screen data associated with the process can be used as a set, whereby the man-hours of a user can be reduced.

CITATION LIST

Patent Literature

Patent Literature 1: Japanese Patent Application Laid-open No. 2001-075790

SUMMARY

Technical Problem

However, when apparatuses are actually used in a system according to the above-described conventional technology, there has been a problem in that it is difficult to operate the apparatuses simply by writing the ladder program and the HMI screen components in the PLC and the HMI; and it is necessary for a user to additionally set information (hereinafter, expressed as apparatus connection information) necessary for communication, such as the type of network between the PLC and the HMI, and the IP addresses, station numbers, and the like for identifying the apparatuses.

Moreover, for example, when the station numbers are changed due to a change in the system configuration or the like, in order to reflect this change in the apparatus connection information on the related apparatuses, it is necessary to change the setting of the apparatus connection information by restarting the related engineering tool.

The present invention is achieved in view of the above and has an object to obtain an engineering apparatus that can reduce the time and effort for a user by resolving also the apparatus connection information when components of the PLC and the HMI screen data are used as a set.

Solution to Problem

To solve the above problem and achieve the object an engineering apparatus that designs an FA system includes: a system-configuration-data generating unit that generates system configuration data that expresses a display apparatus and a control apparatus of an FA system that is an engineering target and a topology thereof; a component storing unit that stores a control component, a screen component, and label information as a set; a component allocating unit that allocates the control component to the control apparatus expressed in system configuration data and allocates the screen component to the display apparatus expressed in system configuration data; a component reflecting unit that renders the control component a usable state for generating and editing a control apparatus program and renders the screen component a usable state for generating and editing display apparatus screen data; an apparatus-connection-information generating unit that automatically generates apparatus connection information for monitoring and operating the control apparatus to which the control component is allocated from the display apparatus to which the screen component is allocated on a basis of the system configuration data; a label-device-information editing unit that edits actual device information that corresponds to label information used in the control component and the screen component; and a component resolving unit that renders the apparatus connection information and the actual device information a usable state in the control apparatus and the display apparatus by associating the apparatus connection information and the actual device information with a control component and a screen component in the control apparatus program and the display apparatus screen data.

Advantageous Effects of Invention

According to the present invention, in the system in which a plurality of apparatuses, such as the PLC and the HMI, are treated as a set, the time and effort to generate a program, screen data, and the like can be reduced and moreover, the time and effort for a user can be reduced by automatically resolving connection information between apparatuses.

BRIEF DESCRIPTION OF DRAWINGS

FIG. 6 is a diagram illustrating apparatus connection information corresponding to component allocation illustrated in FIG. 5.

FIG. 7 is a diagram illustrating an example of actual device information on labels generated by a label-device-information editing unit.

DESCRIPTION OF EMBODIMENT

An engineering apparatus according to an embodiment of the present invention will be described in detail below with reference to the drawings. This invention is not limited to this embodiment.

Embodiment

Figure 1:
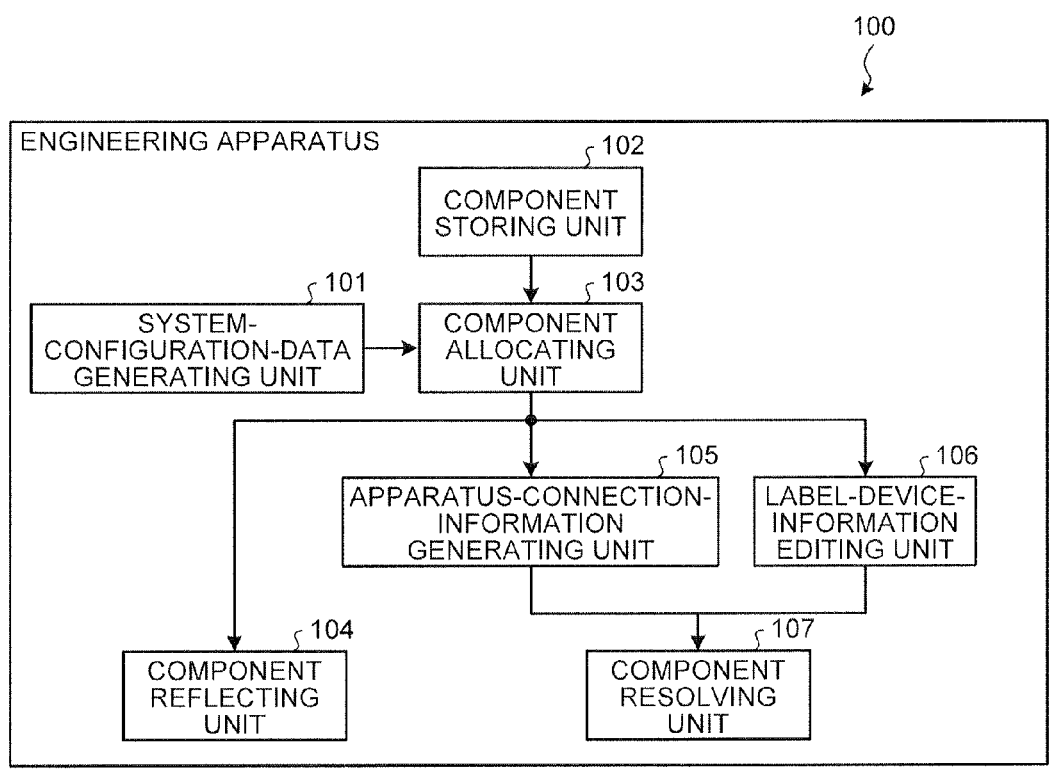
FIG. 1 is a block diagram illustrating the schematic configuration of an engineering apparatus according to a present embodiment of the present invention.

FIG. 1 is a block diagram illustrating the schematic configuration of an engineering apparatus according to the present embodiment of the present invention. An engineering apparatus 100 includes a system-configuration-data generating unit 101, a component storing unit 102, a component allocating unit 103, a component reflecting unit 104, an apparatus-connection-information generating unit 105, a label-device-information editing unit 106, and a component resolving unit 107.

The system-configuration-data generating unit 101 generates system configuration data that expresses the apparatus configuration and the topology of the control system that is an engineering target. The component storing unit 102 stores sets of control components, screen components, and label information. The component allocating unit 103 can allocate a control component and a screen component to the PLC and the HMI expressed in the system configuration data, respectively.

The component reflecting unit 104 renders control components a usable state for generating and editing the PLC program and renders screen components a usable state for generating and editing the HMI screen data. The apparatus-connection-information generating unit 105 generates apparatus connection information for monitoring and operating the PLC from the HMI to which a component is allocated.

The label-device-information editing unit 106 edits actual device information on labels that are used in control components and screen components. The component resolving unit 107 renders the apparatus connection information and the actual device information on labels usable sate in the PLC and the HMI by associating them with control components and screen components in the PLC program and the HMI screen data.

The system-configuration-data generating unit 101, the component allocating unit 103, the component reflecting unit 104, the apparatus-connection-information generating unit 105, the label-device-information editing unit 106, and the component resolving unit 107, which compose the engineering apparatus 100, are each composed of an arithmetic device, such as a CPU. Moreover, the component storing unit 102 is composed of a memory device, such as a ROM and a RAM.

Figure 2:
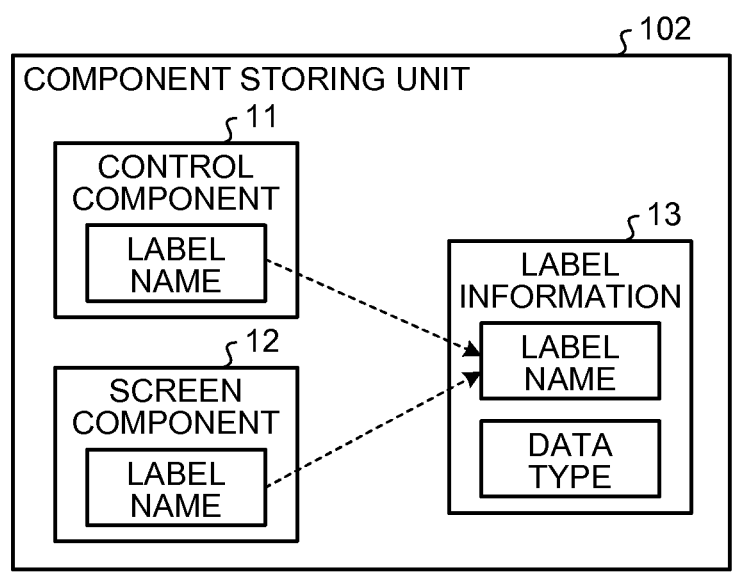
FIG. 2 is a diagram illustrating the relationship among a control component, a screen component, and label information, which are stored in a component storing unit.

FIG. 2 is a diagram illustrating the relationship among a control component, a screen component, and label information, which are stored in the component storing unit 102. A control component 11 is a program component that can be used as part of the PLC program for controlling the PLC. The control component 11 uses the label name instead of the actual device as part of the method of specifying a device that is a control target.

A screen component 12 is a program component that can be used as part of the HMI screen data for monitoring and operating the PLC on the HMI. The screen component 12 uses the label name instead of the actual device as part of the method of specifying a device that is a monitoring and operating target.

Label information 13 is information that manages the association between the label name used in at least one of the control component 11 and the screen component 12 and the data type. One or more pieces of label information are attached to the combination of the control component 11 and the screen component 12 and are stored in the component storing unit 102. Hereinafter, the combination of the control component 11, the screen component 12, and the label information 13 is referred to as a component.

Here, a control component for the PLC and a screen component for the HMI are described; however, the control component and the screen component are not limited to these. For example, the control component may be for a motion controller. In this case, the control component is realized by replacing the PLC with the motion controller. Moreover, for cases other than the motion controller and for a screen component, it is also possible to replace the PLC and the HMI with other configurations in a similar manner.

Figure 3:
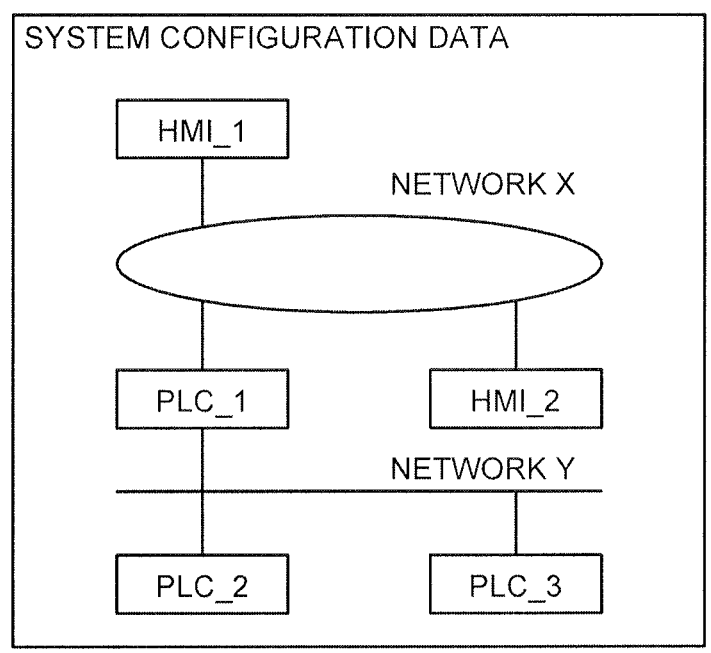
FIG. 3 is a diagram illustrating an example of system configuration data generated by a system-configuration-data generating unit.

Next, the operation of the engineering apparatus 100 will be explained with an example. FIG. 3 is a diagram illustrating an example of the system configuration data generated by the system-configuration-data generating unit 101. The control system expressed by the system configuration data exemplified here is composed of two HMIs, three PLCs, and two control networks.

Figure 4:
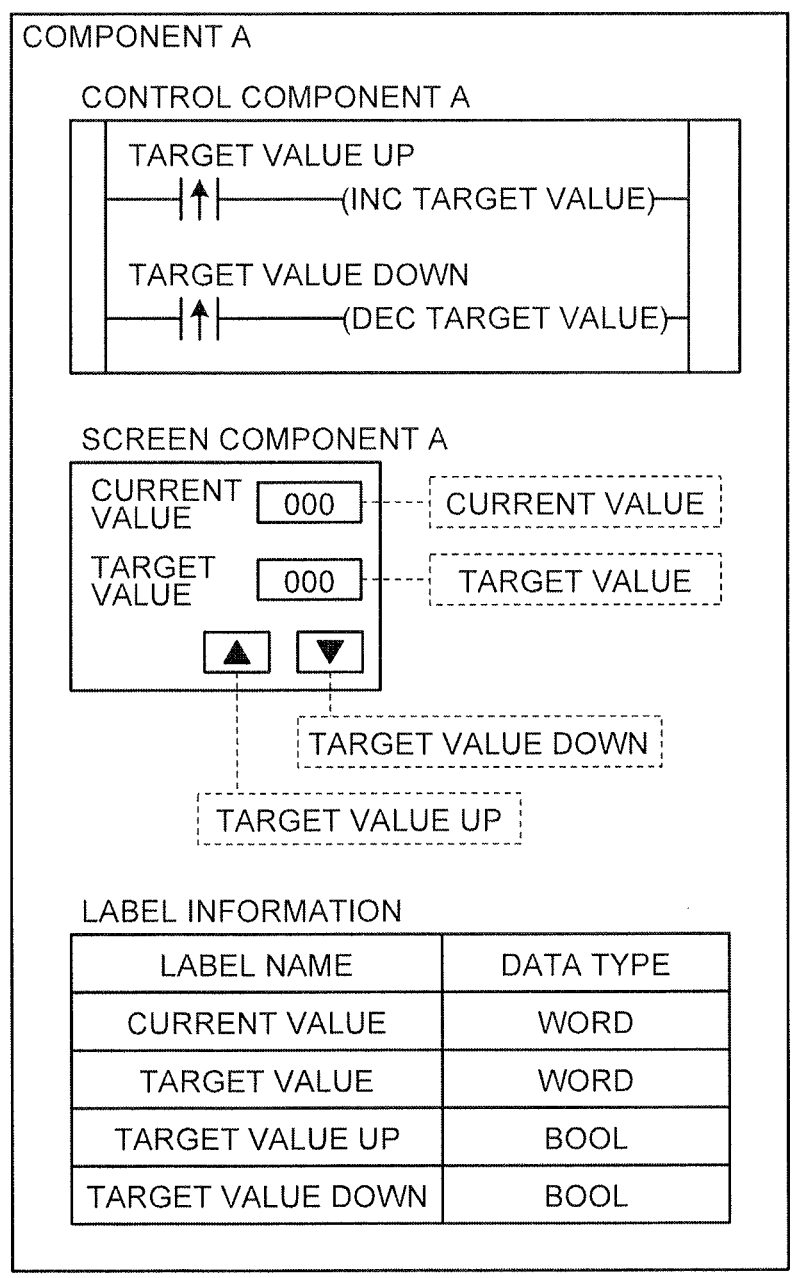
FIG. 4 is a diagram illustrating an example of a component stored in the component storing unit.

FIG. 4 is a diagram illustrating an example of a component stored in the component storing unit 102. The component whose name is "component A" is composed of a control component "control component A", a screen component "screen component A", and label information.

The control component A is a function block written in ladder language and realizes a function of incrementing the value of the label "target value" by 1 when the label "target value UP" becomes ON and decrements the value of the label "target value" by 1 when the label "target value DOWN" becomes ON.

The screen component A is composed of numerical display units that indicate the current value and the target value and buttons for increasing and decreasing the target value. The screen component A displays the value of the label "current value" on the numerical display unit for the current value and displays the value of the label "target value" on the numerical display unit for the target value. Moreover, the screen component A is set such that when the button for increasing the target value is pressed, the label "target value UP" becomes ON and when the button for decreasing the target value is pressed, the label "target value DOWN" becomes ON.

In the label information, the data type is defined for four types of labels used in the control component A and the screen component A. Moreover, there is label information, such as the label "current value", that is used only in any one of the control component A and the screen component A.

Figure 8:
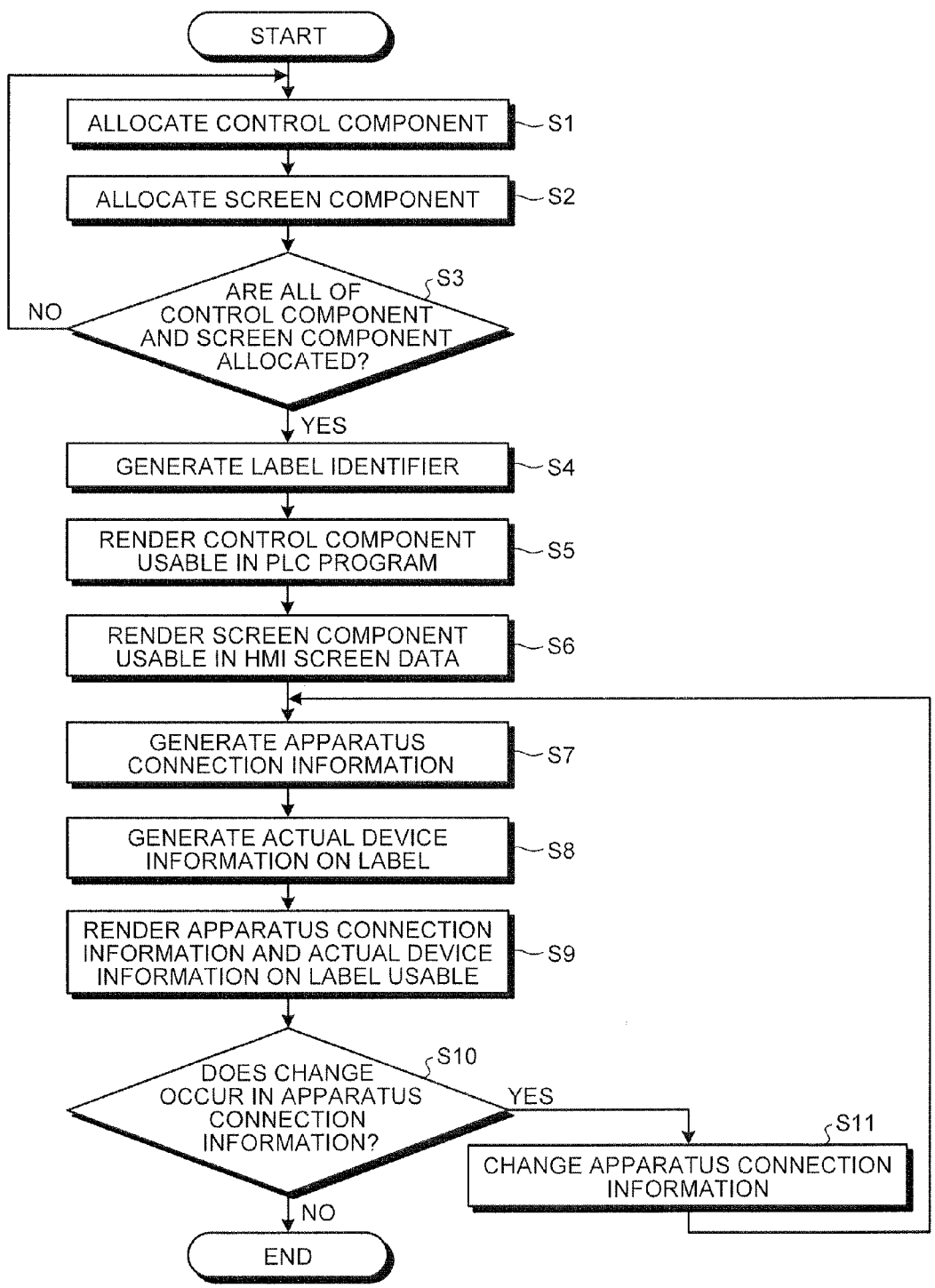
FIG. 8 is a flowchart illustrating the flow of a process performed by the engineering apparatus.

Next, the flow of the operation will be explained with reference to the drawings. FIG. 8 is a flowchart illustrating the flow of the process performed by the engineering apparatus.

Figure 5:
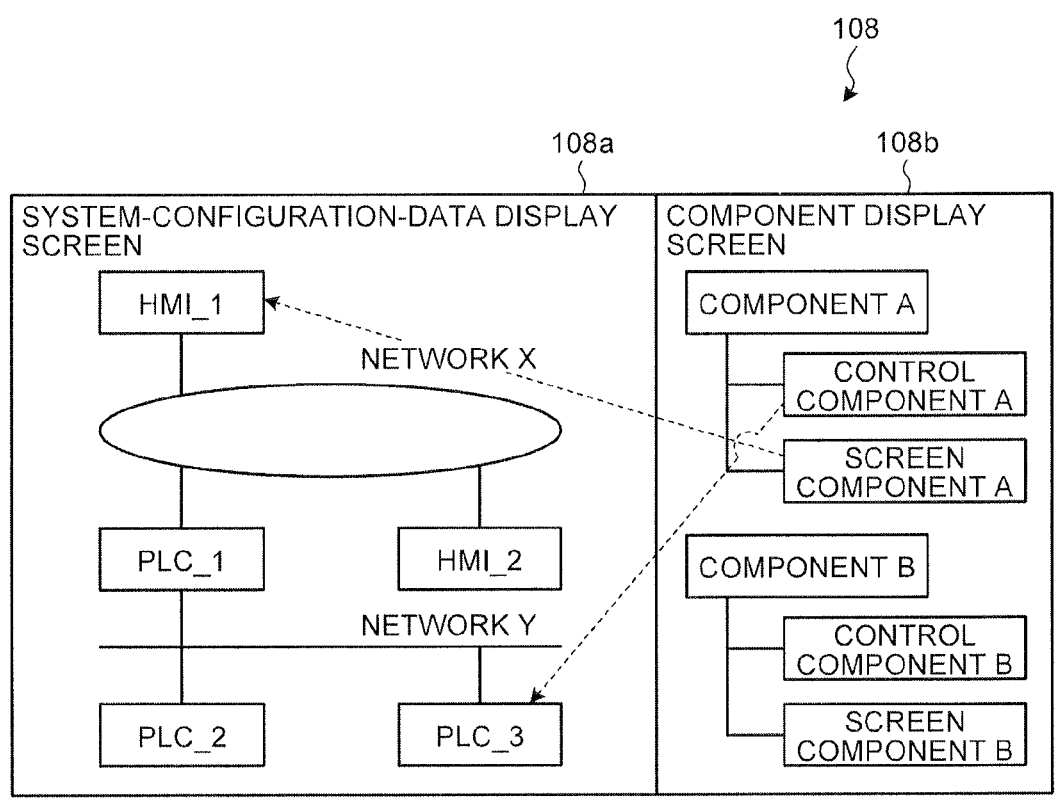
FIG. 5 is a diagram illustrating a display example and an operation example of a component allocating unit.

FIG. 5 is a diagram illustrating a display example and an operation example of the component allocating unit 103. On the screen of a display 108 included in the engineering apparatus 100, a system-configuration-data display screen 108a for displaying the system configuration data and a component display screen 108b for displaying components stored in the component storing unit 102 are displayed.

First, a user selects a control component from the component display screen 108b and allocates it to the PLC in the system configuration data by dragging and dropping it (Step S1). Next, the user selects a screen component corresponding to the control component from the component display screen 108b and allocates it to the HMI in the system configuration data by dragging and dropping it (Step S2). Any of the control component and the screen component may be allocated first. When either one or both of the control component and the screen component are not allocated (No in Step S3), the procedure returns to the process in Step S1.

Allocation of the components to the system configuration data can be realized by performing the two operations illustrated in Step S1 and Step S2. The example illustrated in FIG. 5 schematically illustrates the case where "control component A" is allocated to "PLC_3" and "screen component A" is allocated to "HMI_1". In this example, the case of a drag-and-drop operation is described; however, the association between a control component and the PLC as well as the association between a screen component and the HMI are not limited to the drag-and-drop operation.

When the user performs allocation of the components by using the component allocating unit 103 and both the control component and the screen component are allocated (Yes in Step S3), the label identifier is generated by the label-device-information editing unit 106 (Step S4).

The label identifier is determined by a combination of the component name, identification information for the same component, and the label name (FIG. 7 illustrates an actual state.). For example, the example illustrated in FIG. 7 illustrates a state where the component name is determined to be "component A", the identification information for the same component is determined to be "_1", and the label name is determined to be "current value", "target value", "target value UP", and "target value DOWN".

The label identifier is automatically generated such that the identification information for the same component is unique as the information used when the same component is used at a plurality of locations. It is not necessary to set the label identifier according to the naming rule described above to unchangeable, but it may be such that, after being generated, a user can change the generated label identifier or part thereof.

Next, the component reflecting unit 104 renders the control component and the screen component usable when the PLC program and the HMI screen data are generated or edited (Steps S5 and S6). For example, the control component can be used when the ladder as the PLC program is edited or generated and the arrangement of the screen component can be edited.

The PLC program is a PLC program corresponding to the PLC to which a component is allocated. In the example in FIG. 5, when the PLC program corresponding to "PLC_3" is generated or edited, "control component A" can be used.

In a similar manner, when the HMI screen data corresponding to "HMI_1" is generated or edited, "screen component A" can be used.

At this point, however, although the label is used for specifying a device in a control component, the actual device corresponding to the label is not determined; therefore, the PLC program in which the control component is used cannot be used in the PLC.

In a similar manner, although the label is also used for specifying a device in a screen component, the actual device corresponding to the label and information for specifying the PLC that is monitored and operated are not determined; therefore, the HMI screen data in which the screen component is used cannot be used in the HMI.

Thus, the apparatus-connection-information generating unit 105 generates the apparatus connection information for monitoring and operating the PLC to which a control component is allocated from the HMI to which a screen component is allocated, i.e., information that indicates the path via which the PLC can be monitored or operated from the HMI (Step S7).

FIG. 6 is a diagram illustrating the apparatus connection information corresponding to the component allocation illustrated in FIG. 5. FIG. 6 indicates that, in order to reach the PLC "PLC_3" that is a target for monitoring and operation from the HMI "HMI_1" that performs monitoring and operation, the HMI "HMI_1" reaches the PLC "PLC_3" via "network X", "PLC_1", and "network Y".

In other words, the apparatus-connection-information generating unit 105 recognizes that the HMI is "HMI_1" and the target PLC is "PLC_3" on the basis of the operation in Steps S1 and S2 performed by a user. Then, the apparatus-connection-information generating unit 105 automatically recognizes from the system configuration data that "network X" and "network Y" as relay networks and "PLC_1" as a relay PLC are present between "HMI_1" and "PLC_3" and allocates the information thereon to each item, thereby automatically generating the apparatus connection information illustrated in FIG. 6.

FIG. 6 illustrates the case of relaying two networks; however, the number of relay networks is not limited to this number. Moreover, the apparatus-connection-information generating unit 105 may automatically generate the apparatus connection information described above at a timing immediately after a user uses the component allocating unit 103, at a given timing instructed by a user regardless of the use of the component allocating unit 103, or at any of the above timings.

Moreover, the configuration may be such that, when a user changes the system configuration data, the apparatus-connection-information generating unit 105 automatically updates the apparatus connection information following the change in the system configuration data. Alternatively, the configuration may be such that, when a user directs the apparatus connection information to be regenerated, the apparatus-connection-information generating unit 105 updates the apparatus connection information.

Next, the actual devices can be allocated to the labels corresponding to the allocated components by the label-device-information editing unit 106, whereby the actual device information on the labels is generated (Step S8). The allocation of the actual devices may be specified by a user or may be automatically set by the label-device-information editing unit 106.

FIG. 7 is a diagram illustrating an example of the actual device information on labels generated by the label-device-information editing unit 106. The address of the actual device corresponding to the data type is allocated to each of the four labels used in the component A, i.e., "current value", "target value", "target value UP", and "target value DOWN".

After Step S7 and Step S8, the apparatus connection information and the actual device information on the labels are associated with the control component and the screen component in the PLC program and the HMI screen data by the component resolving unit 107. Consequently, when the PLC program and the HMI screen data are generated or edited, the apparatus connection information and the actual device information can be used (Step S9).

Consequently, the PLC program can be rendered in a usable state in the PLC by applying the actual device information on a label to a portion in which the label is used for specifying a device in the control component used in the PLC program. In a similar manner, the HMI screen data can be rendered in a usable state in the HMI by applying the actual device information on a label and the apparatus connection information to a portion in which the label is used for specifying a device in the screen component used in the HMI screen data. For example, the current value of a specified device is displayed on a portion of the label corresponding to "current value" of the screen component and the target value of a specified device is displayed on a portion of the label corresponding to "target value" of the screen component.

Moreover, in the case where a change to the system configuration related to the apparatus connection information occurs after the apparatus connection information is once set to the apparatuses (Yes in Step S10), when the apparatus connection information is changed by the system-configuration-data generating unit 101 (Step S11), the update process of the related apparatus connection information and the like are performed in accordance with the flow from Step S7 described above.

As described above, according to the present embodiment, the apparatus connection information for monitoring and operating the PLC from the HMI is automatically generated simply by allocating a control component to the PLC and allocating a screen component to the HMI without troubling a user. Therefore, the time and effort of the setting operation for a user who performs programming by using components can be reduced.

Moreover, even when the system configuration data is changed, the apparatus connection information is automatically generated in accordance with the change. Therefore, the time and effort of the setting operation for a user can be reduced.

In this example, the example of the association between a control component and a screen component is illustrated; however, this may be the association between control components and this case can be realized by replacing a screen component with a control component. Moreover, this example illustrates the case where the ratio between the related components is 1:1; however, combinations with a ratio other than 1:1 may be applied. This case can be realized by defining such that a component includes a plurality of control components or a plurality of screen components.

INDUSTRIAL APPLICABILITY

As described above, the engineering apparatus according to the present invention is useful for designing a system composed of FA equipment, such as a PLC and an HMI.

REFERENCE SIGNS LIST

11 control component
12 screen component
13 label information
100 engineering apparatus
101 system-configuration-data generating unit
102 component storing unit
103 component allocating unit
104 component reflecting unit
105 apparatus-connection-information generating unit
106 label-device-information editing unit
107 component resolving unit
108 display
108a system-configuration-data display screen
108b component display screen

The invention claimed is:

1. An engineering apparatus for designing factory automation (FA) system comprising:
    a system-configuration-data generating unit that generates system configuration data that expresses a display apparatus and a control apparatus of the FA system that is an engineering target and a topology thereof;
    a component storing unit that stores a control component, a screen component, and label information as a set by associating the control component, the screen component, and the label information with each other by using a label name;
    a component allocating unit that performs allocation of the control component to the control apparatus expressed in system configuration data and allocation of the screen component to the display apparatus expressed in system configuration data;
    a component reflecting unit that, when allocation of the control component and the screen component in the set has been performed, renders the control component into a usable state for generating and editing a control apparatus program and renders the screen component into a usable state for generating and editing display apparatus screen data;
    an apparatus-connection-information generating unit that automatically generates apparatus connection information comprising a connection path via which the control apparatus is connected to the display apparatus such that the display apparatus monitors and operates the control apparatus, said connection path is determined based on the system configuration data and the control apparatus and the display apparatus for the connection path are selected from the system configuration data based on the stored set;
    a label-device-information editing unit that edits device information that corresponds to label information used in the control component and the screen component; and
    a component resolving unit that renders the apparatus connection information and the device information that corresponds to label information into a usable state in the control apparatus and the display apparatus by associating the apparatus connection information and the device information with the control component and the screen component in the control apparatus program and the display apparatus screen data.

2. The engineering apparatus according to claim 1, wherein a plurality of control components are stored in the component storing unit as a set, and the component allocating unit performs allocation of the control components to the control apparatus.

3. The engineering apparatus according to claim 1, wherein:
    the control component and the screen component are stored in the component storing unit as a first set such that at least one of: the control component and the screen component comprise a plurality of components, and the component allocating unit sets said at least one of: the control component to be allocated to the control apparatus and the screen component to be allocated to the display apparatus to be in ratio such that the plurality of components are associated with a single component of other type of component selected from among the control component and the screen component.

4. The engineering apparatus according to claim 1, wherein, in response to changes in the system configuration data, the apparatus-connection-information generating unit is further configured to automatically update the apparatus connection information which associates the control component of the control apparatus to the corresponding screen component of the display apparatus such that operations of the control apparatus are monitored in the display apparatus via the corresponding screen component.

5. The engineering apparatus according to claim 1, wherein the system configuration data comprises a path via which the control apparatus is operated by the display apparatus.

6. The engineering apparatus according to claim 1, wherein the system configuration data comprises at least one relay network and at least one relay apparatus.

7. The engineering apparatus according to claim 1, wherein, in response to a selection via a user interface of the control component for the control apparatus and of the screen component for the display apparatus, the component allocating unit, generating the label name, which is unique and links the selected components into the set.

8. The engineering apparatus according to claim 7, wherein the label information further comprises a plurality of label identifiers, which are shared by the control component and the screen component and which comprise a combination of a component identification information and the label name.

9. An engineering apparatus for designing factory automation (FA) system comprising:
a system-configuration-data generating unit that generates system configuration data that expresses a plurality of control apparatuses of an FA system that is an engineering target and a topology thereof;
a component storing unit that stores a plurality of control components and label information as a set by associating the control components and the label information with each other by using a label name;
a component allocating unit that performs allocation of the control components to the control apparatuses expressed in system configuration data;
a component reflecting unit that, when allocation of the control components in the set has been performed, renders the control components into a usable state for generating and editing a control apparatus program;
an apparatus-connection-information generating unit that automatically generates apparatus connection information comprising a connection path via which the control components are connected, said connection path is determined based on the system configuration data and the control components for the connection path are selected from the configuration data based on the stored set;
a label-device-information editing unit that edits device information that corresponds to label information used in the control components; and
a component resolving unit that renders the apparatus connection information and the device information that corresponds to label information into a usable state in the control apparatuses by associating the apparatus connection information and the device information with a control component in the control apparatus program.

* * * * *